(12) United States Patent
Sidi (10) Patent No.: US 8,550,528 B2
(45) Date of Patent: Oct. 8, 2013

(54) EXPANDING MOBILE UTILITY STRUCTURE

(75) Inventor: Charles Sidi, Phoenix, AZ (US)

(73) Assignee: Sidi Spaces LLC, Scottsdale, AZ (US)

( * ) Notice: Subject to any disclaimer, the term of this patent is extended or adjusted under 35 U.S.C. 154(b) by 1 day.

(21) Appl. No.: 13/428,744

(22) Filed: Mar. 23, 2012

(65) Prior Publication Data

US 2012/0242103 A1 Sep. 27, 2012

Related U.S. Application Data

(60) Provisional application No. 61/466,834, filed on Mar. 23, 2011.

(51) Int. Cl.
*B60P 3/34* (2006.01)
(52) U.S. Cl.
USPC ..................................................... 296/26.02
(58) Field of Classification Search
USPC ............ 296/26.02, 168, 180.2, 180.3, 180.4, 296/182.1, 184.1, 185.1, 186.1, 191, 24.31, 296/24.4, 26.15, 36; 52/79.5; 280/407, 477, 280/490.1
See application file for complete search history.

(56) References Cited

U.S. PATENT DOCUMENTS

| | | | | |
|---|---|---|---|---|
| 3,308,845 | A * | 3/1967 | Bellas et al. | 137/234.6 |
| 3,677,600 | A * | 7/1972 | Charron | 296/170 |
| 3,709,551 | A * | 1/1973 | McCarthy | 296/170 |
| 3,941,414 | A * | 3/1976 | Platt | 296/170 |
| 4,463,982 | A * | 8/1984 | Irelan | 296/170 |
| 4,807,924 | A * | 2/1989 | Kottke | 296/164 |
| 4,981,318 | A * | 1/1991 | Doane et al. | 296/182.1 |
| 5,383,703 | A * | 1/1995 | Irvine, III | 296/24.45 |
| 6,422,628 | B1 * | 7/2002 | Bortell | 296/26.13 |
| 6,817,653 | B2 * | 11/2004 | Ropp | 296/186.2 |
| 7,150,466 | B1 * | 12/2006 | Chapman et al. | 280/656 |
| D551,128 | S * | 9/2007 | Renard | D12/102 |
| 2004/0094983 | A1 * | 5/2004 | Bortell | 296/26.12 |
| 2004/0194396 | A1 * | 10/2004 | Shanni | 52/79.5 |
| 2005/0284035 | A1 * | 12/2005 | DeOvando et al. | 52/79.1 |
| 2010/0036707 | A1 * | 2/2010 | Gilchrist | 705/9 |
| 2010/0164190 | A1 * | 7/2010 | Kloepfer | 280/30 |
| 2011/0057475 | A1 * | 3/2011 | Cunningham | 296/165 |
| 2012/0013093 | A1 * | 1/2012 | Frank et al. | 280/79.11 |

* cited by examiner

*Primary Examiner* — Kiran B Patel
(74) *Attorney, Agent, or Firm* — Snell & Wilmer L.L.P.

(57) ABSTRACT

A mobile utility structure is disclosed that may include a trailer that efficiently expands to a larger usable space while allowing for improved light and visual appeal. The trailer may be usable as mobile utility structure such as a storefront. The usable space is expanded by folding side panels of the structure out and extending the multi-fold door to enclose the folded out side panels. The system enables quick and easy setup of an aesthetically appealing structure.

14 Claims, 12 Drawing Sheets

EXPANDING MOBILE UTILITY STRUCTURE

CROSS-REFERENCE TO RELATED APPLICATIONS

This application is a U.S. Non-Provisional Application filed claiming priority to U.S. Provisional Application Ser. No. 61/466,834 filed Mar. 23, 2011, and entitled "Transforming Self-Contained Solar Powered Portable Mobile Structure," which is incorporated herein by reference in its entirety.

FIELD

This disclosure relates to the field of expanding mobile utility structures.

BACKGROUND

Present day portable mobile structures are typically designed for their intended use, for example, a horse trailer for horses, a recreational vehicle for residential use or a car for carrying a trailer/structure. These portable structures are each constructed for a specific purpose. Current portable mobile structures are required to also adhere to road license vehicle restrictions (unless a special permit is acquired, usually seen for "double wide" buildings) and all portable structures can be no wider than eight foot six inches (8 ft. 6 in.). This in itself limits the use of space when stationary.

The majority of portable structures are often very cumbersome to transport and to operate, while usually taking a long time to set up and deploy so the structure is ready for use. They typically take a number of operatives and many hours to get them ready for their purpose. Some portable buildings have to be taken off a large vehicle with heavy crane equipment to have them deployed and then placed on foundations ready for use. Others may include large semi-trucks that are very cumbersome to maneuver into the desired location, which can be restrictive in their use. These portable structures typically do not include wall to wall glass doors to allow high levels of light to enter the space creating a healthy work environment. In fact, such structures try to minimize windows and light to conserve electricity and to enhance privacy. Typical portable mobile structures are restrictive in terms of multiple uses and applications, along with energy conservation issues.

SUMMARY

Various embodiments of devices and systems for a mobile utility structure are disclosed in more detail below. In various embodiments, a mobile utility system may comprise an enclosed trailer having an access spanning at least a portion of one side of the trailer. An adjustable floor may span at least a portion of the access. The adjustable floor may be connected by a floor hinge to a horizontal support across the bottom of the access. An adjustable roof may span at least a portion of the access. The adjustable roof may be connected by a roof hinge to a horizontal support across the top of the access. The mobile utility system may further comprise one or more multifold doors having at least a first panel and second panel. The first panel may connect to a first vertical support post by a first hinge. The first panel may connect to the second panel by a second hinge. The first panel may have at least one lock on a corner opposite the first hinge. The second panel may have at least one lock on the corner of the second panel on the side opposite the second hinge.

In response to the mobile utility structure being in an open position, the first panel, the second panel, the adjustable roof, and the adjustable floor may extend out of the trailer, providing an expanded usable interior trailer area. In response to the mobile utility structure being in a closed position, the first panel and the second panel may be folded inside the trailer and the adjustable roof and the adjustable floor may be folded onto the side of the trailer.

In accordance with various embodiments, a method for maximizing the usable space of a trailer system may comprise providing a trailer having a first bi-fold door and a second bi-fold door. The first bi-fold door and the second bi-fold door may be secured to vertical supports on either side of a rear access opening in the trailer. An adjustable roof secured to a horizontal support across the top of the rear access opening in the trailer may also be provided. Additionally, an adjustable floor secured to a horizontal support across the bottom of the rear access opening in the trailer may be provided. The adjustable floor may be folded down parallel with the floor of the trailer. The adjustable roof may be folded up towards (e.g., parallel to) the adjustable floor. The first bi-fold door may be extended out of the trailer in a position having a first panel of the first bi-fold door at an angle (e.g., perpendicular) to the rear access. The second bi-fold door may be extended out of the trailer in a position having a first panel of the second bi-fold door at an angle (e.g., perpendicular) to the rear access. A second panel of the first bi-fold door and a second panel of the second bi-fold door may be positioned as swinging doors for entrance into the trailer.

Accordingly, in various embodiments, a mobile utility system may comprise an enclosed trailer having an access spanning at least a portion of one side of the trailer. An adjustable side roof may be connected by a side roof hinge to an upper horizontal support perpendicular to the access. An adjustable side panel may be connected by a side panel hinge to a side of the trailer. The adjustable side panel may be operable to cover the adjustable side roof in response to the adjustable side panel and the adjustable side roof being in a closed position. The adjustable side panel may be operable to be secured to the side of the adjustable side roof in response to the adjustable side panel and the adjustable side roof being in an open position. The mobile utility system may further comprise an adjustable floor spanning at least a portion of the access. The adjustable floor may be connected by a floor hinge to a horizontal support across the bottom of the access. The mobile utility system may also comprise an adjustable roof spanning at least a portion of the access. The adjustable roof may be connected by a roof hinge to a horizontal support across the top of the access.

The mobile utility system may further comprise a first bi-fold door operable to be folded to the inside of the trailer in response to the trailer being in a closed position and operable to be opened to the outside of the trailer and engaged with the adjustable roof and the adjustable floor, in response to the trailer being in an open position. A second bi-fold door may be operable to be folded to the inside of the trailer in response to the trailer being in a closed position and operable to be opened to the outside of the trailer and engaged with the adjustable roof and the adjustable floor, in response to the trailer being in an open position. The first bi-fold door and the second bi-fold door may be operable to enclose the area between the adjustable roof and the adjustable floor, in response to the trailer being in an open position.

BRIEF DESCRIPTION OF THE DRAWINGS

The subject matter of the invention is particularly pointed out and distinctly claimed in the concluding portion of the specification. The invention, however, both as to structure and method of operation, may best be understood by reference to the following description taken in conjunction with the claims and the accompanying drawing figures, in which like parts may be referred to by like numerals. Left and right descriptions of the drawings is defined as what is left and right when one is standing inside the invention while facing the vehicle hauling invention.

DETAILED DESCRIPTION

The detailed description of various embodiments herein are further clarified in the accompanying drawings, which show exemplary embodiments by way of illustration. While these exemplary embodiments are described in sufficient detail to enable those skilled in the art to practice the disclosure, it should be understood that other embodiments may be realized and that mechanical, logical, and chemical changes may be made without departing from the spirit and scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 12:
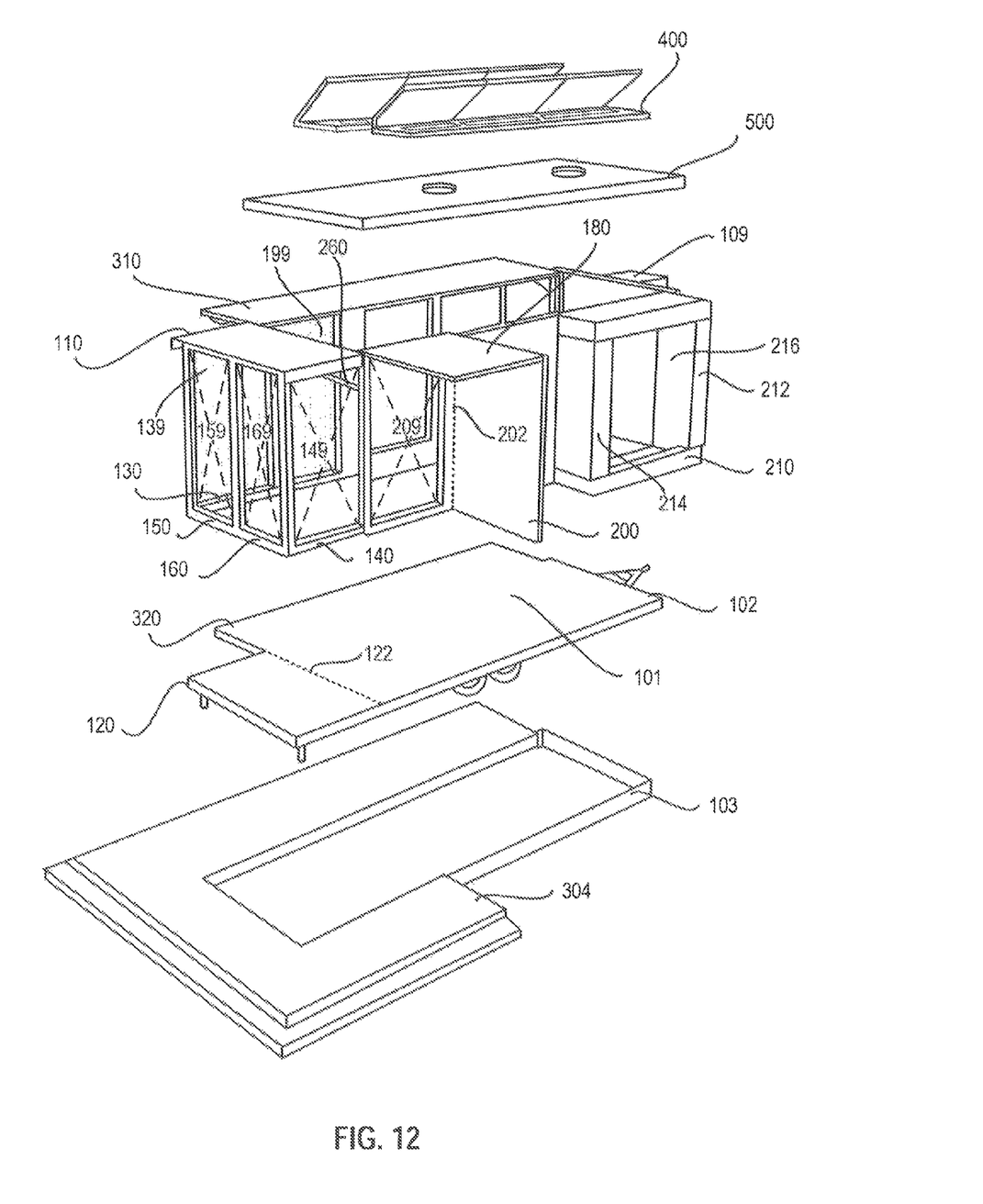
FIG. 12 is an exploded perspective drawing of a mobile utility structure in a fully expanded position from the right rear perspective, in accordance with various embodiments.

In accordance with various embodiments, an expanding mobile utility structure 300 is provided. The mobile utility structure may comprise the same basic parts as a typical enclosed trailer such as a frame, a bed, suspension, wheels, vehicle connection, and a similar overall shell of an enclosed trailer including walls roof etc. (see e.g. FIG. 12 showing roof 500, trailer bed 101 and a tongue, wheels, etc.) The mobile utility structure may even appear to be a basic enclosed trailer while in transit, but once stationary, the structure may be transformed quickly into an aesthetically appealing utility structure with an appearance of permanence.

In accordance with various embodiments, an expanding mobile utility structure may be fully or partially self-contained. In one example, the structure may be a portable building. For use as a business office, retail store front, pop-up-store, showroom, street vender, display booth, events center, information center. The structure may also be customized to specific business requirements using, for example, specialized wrapping. The structure may also accommodate utility specific features such as, for example, water tanks storage for clean dirty water (e.g., up to 50 gallons each). The structure has the ability to be changed and designed according to each business desire or requirement.

In accordance with various embodiments, the structure may be partially or fully comprised of, for example, fabric, metal, polymer, wood, and/or any combination or composite of the same. For example, the structure may be constructed using a very strong lightweight steel frame (e.g. 3" by 1½" tubing) and skinned with a thin polymer or aluminum sheeting.

In accordance with various embodiments, the structure may be constructed using any combination of Green Building technologies that save energy and/or provide a sustainable environment for any business. The structure may be thoroughly insulated using, for example, three inch (3 in.) rigid high R-value insulation. For example, various panels that make up the structure may comprise of a skinned inner and exterior surface with insulation in between. Notably typical portable structures use little if no insulation in the walls and roof, wasting significant energy, requiring large generators or increased electrical energy consumption to compensate for the lack of insulation. The structure's increased thermal efficiency helps to reduce energy consumption significantly and provides superior comfort in all climates.

In accordance with various embodiments, the structure may comprise solar panels (see e.g. FIG. 12 solar panels 400) that are operated in conjunction with solar actuators (angle automatically to the sun). On-board storage batteries may produce and store up to approximately 1000 w per day. Incorporation of a power system such as this enables various electricity consumers to be operated within the unit without the need for exterior power. For example, several laptop computers which use approximately 3 watts per hour, per computer, could be powered by the utility structure. In another example, at least some of the lighting and/or power is low voltage LED lights, which again reduce energy consumption, but can also rely on power provided by the solar panels. As the user travels to an event or to a customer, the structure is charging the batteries in transit, and when the user arrives, the structure is able to power some or all the various on-board components such as, for example, lights, computers, televisions, hydraulics, speakers, or similar utility electronics. The charge may last for eight hours or more.

In accordance with various embodiments, the structure may also comprise features that maximize the use of natural daylight. The mobile utility structure may substantially substitute energy use by using, for example, Solatubes® in the roof construction and/or large glass panels on multiple walls and/or doors for letting in natural light. There is a notable lack of mobile structures that use large glass wall panels. In part there is difficulty overcoming vibration issues with mobile structures which can destroy a glass wall or door panels. However, in accordance with various embodiments, the mobile utility structure may comprise glass wall and/or door panels, for example, glass panes 139, 149, 159, 169, 199, 209, and 216. The glass panels may be glazed glass. The panels may be vibration resistant. For example, the frames containing the glass panes may have neoprene strips placed within the frame to resist vibration between the frame and the glazed glass pane and therefore allow the large glazed areas to stay intact during travel.

In accordance with various embodiments, the structure may be setup in such a manner as to allow the user to open it up and expand the actual fixed space considerably within a very short period of time. For example, the mobile utility structure can be deployed and opened up in less than 15 minutes using a single user.

In accordance with various embodiments, the structure may include elements that allow the structure to expand, increasing the usable interior space. The various elements may increase the size and shape of the structure. As illustrated in FIGS. 1-5, at least one of these elements may include a hydraulic slide-out side 210. In one example, the hydraulic slide-out side 210 may be approximately 8' by 7' by 28" deep. The hydraulic slide-out side 210 may have panels 212 and 214 that cover and protect the glass pane 216. When deployed the panels 212 and 214 may be folded to either side of hydraulic slide-out side 210 allowing substantial amounts of light to come through the large window into the increased interior area.

In accordance with various embodiments, the structure may also expand using adjustable floors, adjustable roofs and multi-fold doors. For example, a floor may fold down from across an access area of the structure and a roof may fold up from across the access area of the structure. From inside the structure multi-fold doors may fold out of the sides of the access and enclose around the expanded floor and expanded roof area. Thus, the mobile utility structure expands in usable area.

As illustrated in various figures, the mobile utility structure may have an access 106. Access 106 may be any large opening or entrance into the mobile utility structure. A horizontal upper support 114 and a horizontal lower support 124 may extend across the top and bottom of the access respectively. A vertical support post 134 and 144 may extend vertically on either side of the access. The various supports may be part of the structural frame of the mobile utility structure. The various supports may be part of the floor, roof, or walls of the mobile utility structure. The various supports may be any part of the mobile utility structure suitable to provide the necessary support to the panels, doors, or other elements fixed thereto.

An adjustable floor 120 may be connected to the lower horizontal support 124 through floor hinge 122. An adjustable roof 110 may be connected to the upper horizontal support 124 through roof hinge 112. In a closed position adjustable floor 120 and adjustable roof 110 may fold against the side of the mobile utility structure until they are vertical. In the closed position adjustable floor 120 and adjustable roof 110 are operable as a barrier on across access 106 as illustrated in FIG. 3. In an open position adjustable roof 110 and adjustable floor 120 may fold out from the mobile utility structure until they are horizontal and/or parallel with the floor of the mobile utility structure. In an open position adjustable roof 110 extends the usable roof of the structure and adjustable floor 120 extends the usable floor space of the structure as illustrated in FIGS. 1, 2, 6, and 7.

In accordance with various embodiments, each multi-fold door may comprise a plurality of panels. Each panel may have an outside frame and an interior panel area. In one example, as discussed above, the panel area may be a glazed glass pane (129, 149, 159, and 169) having neoprene strips placed between the frame and the glazed glass pane to resist vibration between the frame and the glazed glass pane. In another example, the panel may be some other material used as a barrier or used as an advertisement. The plurality of panels may be connected directly to one another through a hinge. One end of the plurality of panels may be connected to a vertical support post tying the multi-fold door into the structure. One or more sets of multi-fold doors may be incorporated into the structure, allowing the structure to expand in size by folding the multi-fold doors out and away from the structure.

In accordance with various embodiments, a first panel 130 may be connected to a second panel 150 through a hinge 152, forming a first bi-fold door. The first panel 130 may be connected to a vertical support post 134 through a hinge 132. Similarly a third panel 140 may be connected to a fourth panel 160 through a hinge 162 forming a second bi-fold door. The third panel 140 may be connected to a vertical support post 144 through hinge 142. Connecting the first and second bi-fold doors to the supports 134 and 144 on either side of access 106 allows for the two bi-fold doors to extend away from the mobile utility structure in an open position.

Figure 1:
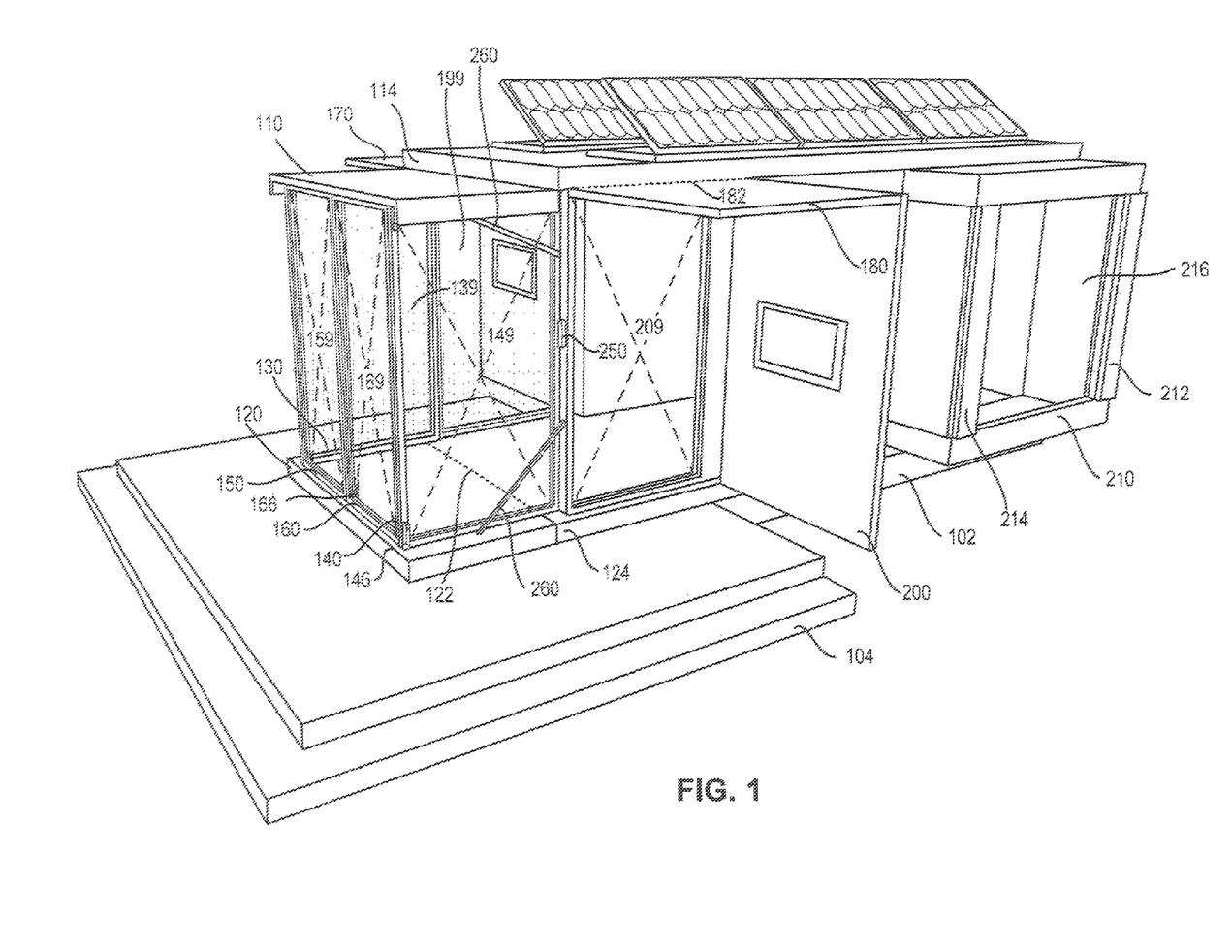
FIG. 1 is a perspective drawing of a mobile utility structure in a fully expanded position from the right rear viewpoint, in accordance with various embodiments.
Figure 2:
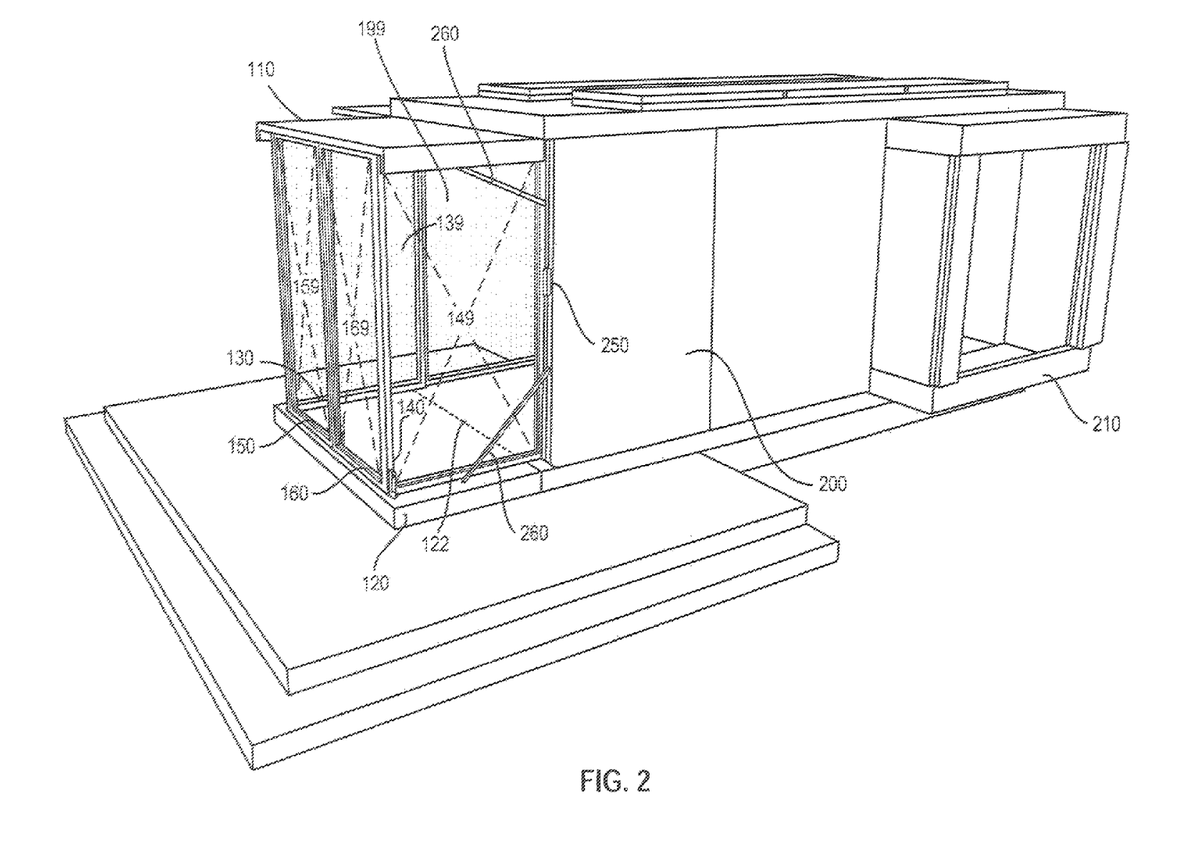
FIG. 2 is a perspective drawing of a mobile utility structure with a rear access and side slide out expanded from the right rear viewpoint, in accordance with various embodiments.
Figure 3:
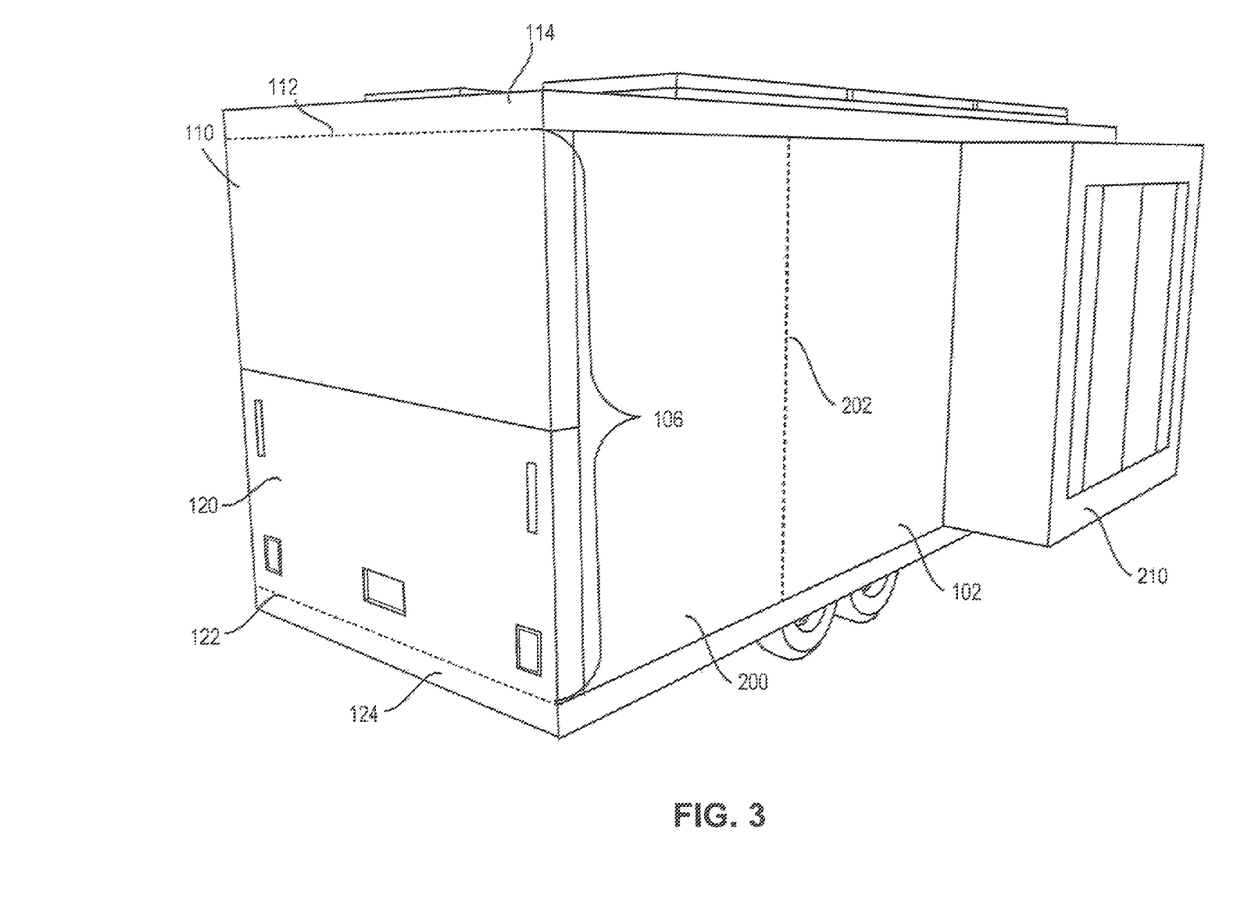
FIG. 3 is a perspective drawing of a mobile utility structure with only a side slide out expanded, in accordance with various embodiments.
Figure 8:
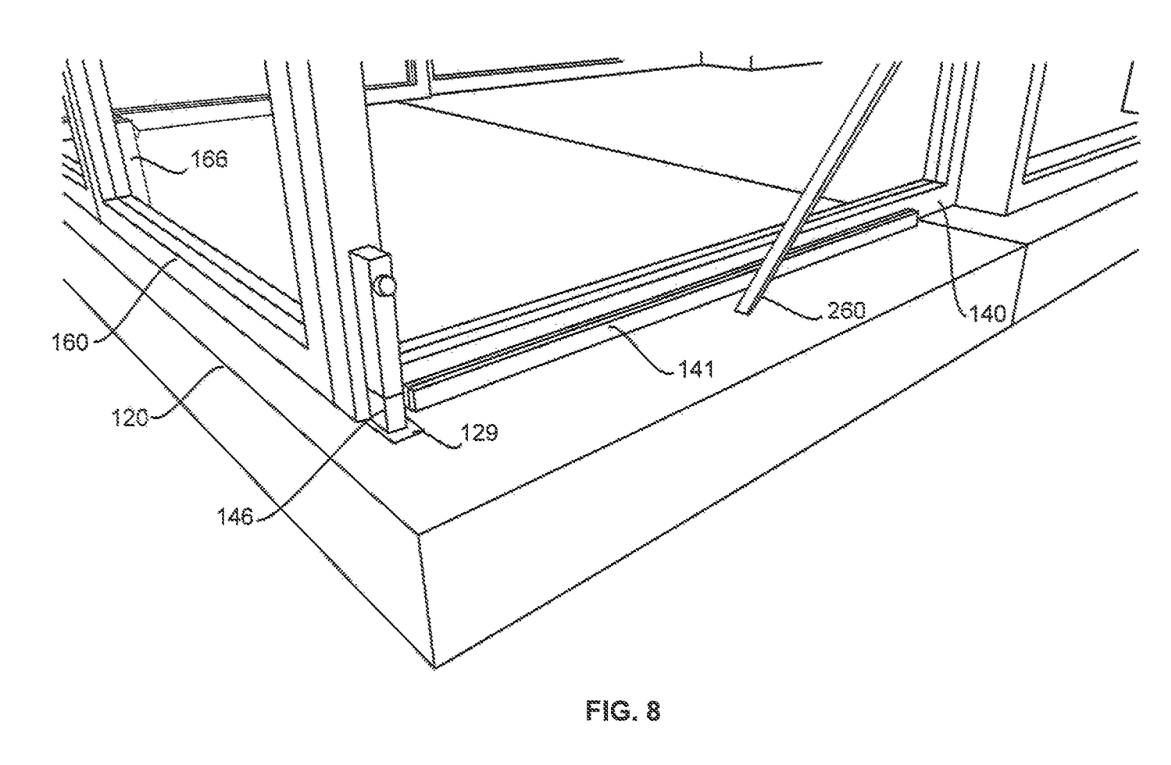
FIG. 8 is a perspective drawing of a lower section of an expanded porch showing a lock, an anchor and an abutment of a mobile utility structure from a right rear viewpoint, in accordance with various embodiments.
Figure 9:
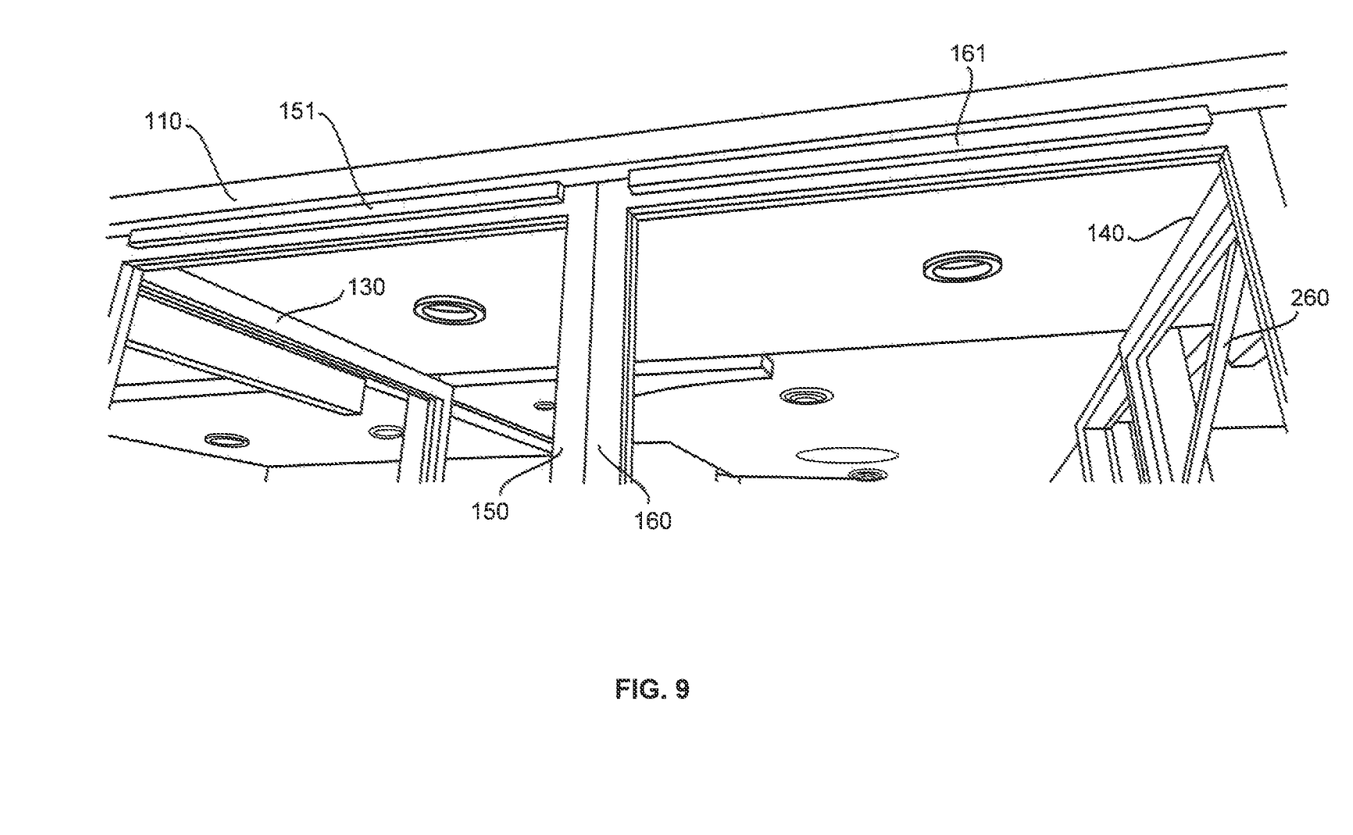
FIG. 9 is a perspective drawing of an upper section of an expanded porch showing abutments of a mobile utility structure from the rear viewpoint, in accordance with various embodiments.

In accordance with various embodiments, as shown in FIG. 1-3, adjustable floor 120 may fold down, adjustable roof 110 may fold up, and panels 130, 140, 150 and 160 may extend out into the space between adjustable floor 120 and adjustable roof 110. Panels 130 and 140 may be located perpendicular to access 106. Panels 150 and 160 may then swing between Panels 130 and 140 operating as swinging doors entering into or exiting form the mobile utility structure. As shown in FIGS. 8 and 9, abutments 151, 161, and 141 (and while not shown an abutment opposite 141 which supports panel 130 on floor 120) may provide additional support to panels 130, 140, 150 and 160 by preventing the panels from over swinging. In one example, the abutments may be any supportive protrusion from roof 110 and/or floor 120. In another example the abutments may be separate brackets interfacing with roof 110 and/or floor 120. The abutments 151 and 161 are particularly useful as they may prevent panels 150 and 160 from swinging out when panels 150 and 160 are otherwise unrestrained when they are used as swinging doors to enter the structure. The various abutments may also be operable as weather stripping, providing increased protection to the interior of the utility structure from the exterior elements.

In accordance with various embodiments, as shown in FIGS. 1, 2, 6-8, and 10, panels 130, 140, 150 and 160 may include a locking mechanism configured to prevent the doors from moving. The locking mechanism can be any one known in the art. In one example, a sliding bolt may be used to restrain the relationship between panels 130, 140, 150 and 160 and the adjustable floor 120, adjustable roof 110, and/or the trailer 102. The lock or sliding bolt may be located on any position on the door such that when the bolt is extended it may engage an anchor located on a stationary element. For example, the lock may be located on a corner of one of the panels 130, 140, 150 and 160 opposite a hinge on the panel. Panel 130 may be attached to vertical support post 134 by a hinge 132; as such the lock 136 may be located on the bottom corner and/or lock 138 may be located on the top corner of panel 130 on the opposite edge of hinge 132. Panel 150 may be attached to panel 130 by hinge 152; as such, the lock 156 may be located on the bottom corner and/or lock 158 may be located the top corner of panel 150 on the opposite edge of hinge 152. Panels 140 and 160 may likewise have locks 146, 148, 166 and 168 situated thereon.

In accordance with various embodiments, as shown in FIGS. 4-8, locks 136, 146, 156, 166, 138, 148, 158, and 156 may variously engage anchors located in the adjustable floor 120, adjustable roof 110, and/or the trailer floor. The anchors may be specifically located in the various elements in order to locate the panels 130, 140, 150 and 160 in desirable locations in an expanded/open and/or a closed position. For example, anchor 126 may be located in adjustable floor 120 such that when lock 136 engages anchor 126, panel 130 is perpendicular to access 106. Likewise anchor 129 may be located in adjustable floor 120 such that when lock 146 engages anchor 129, panel 140 is perpendicular to access 106. Similarly anchors 116 and 119 may secure panels 130 and 140 respectively to adjustable roof 110 in a perpendicular position relative to access 106.

Figure 4:
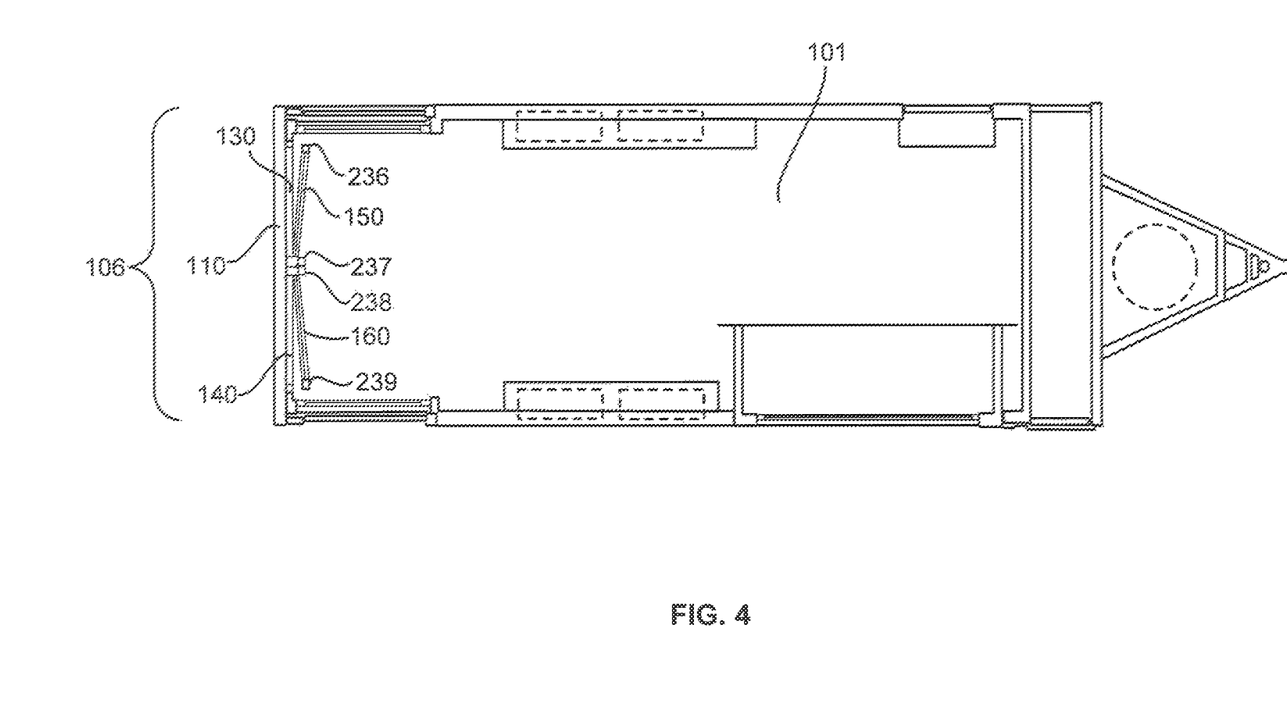
FIG. 4 is a top view cross section of a mobile utility structure in a fully closed position, in accordance with various embodiments.
Figure 5:
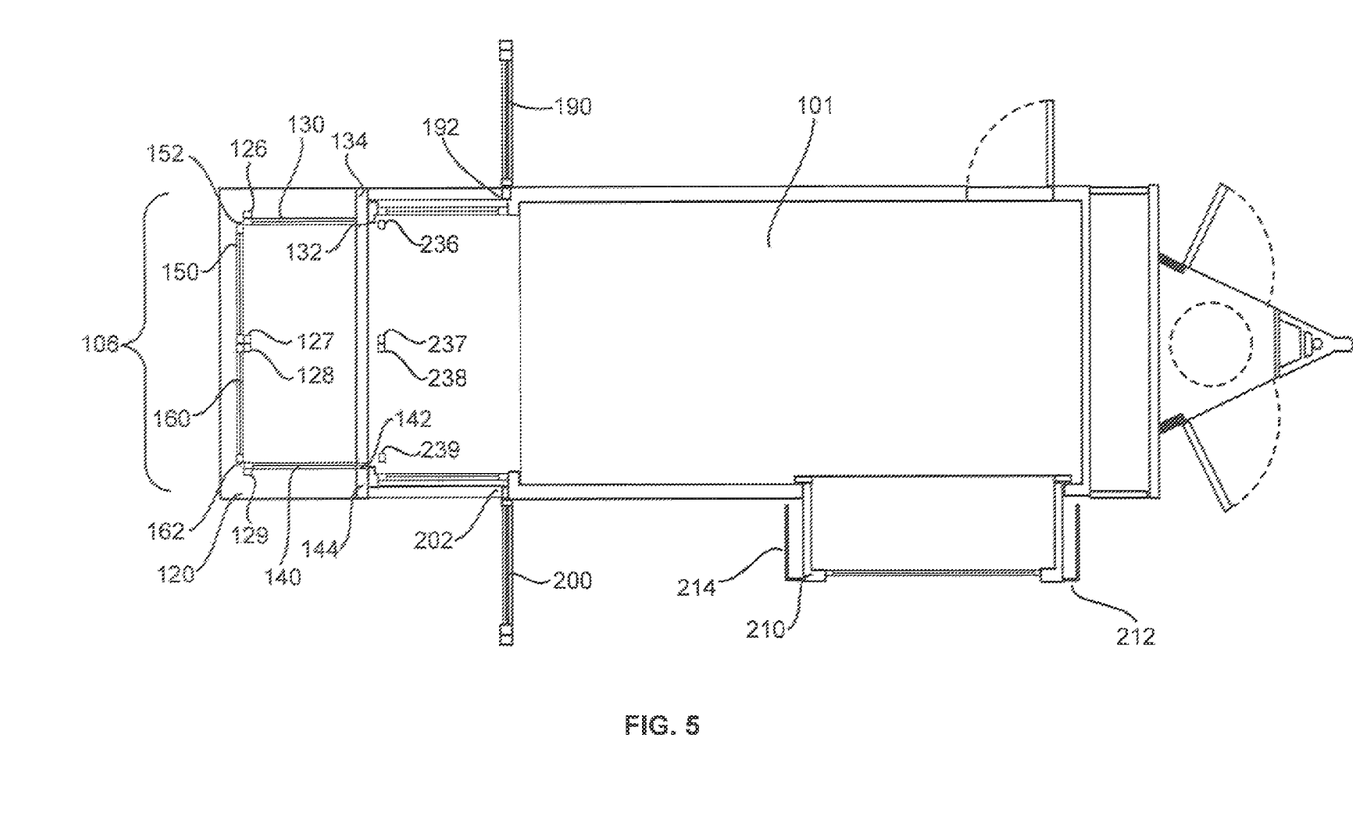
FIG. 5 is a top view cross section of a mobile utility structure in a fully expanded position, in accordance with various embodiments.
Figure 6:
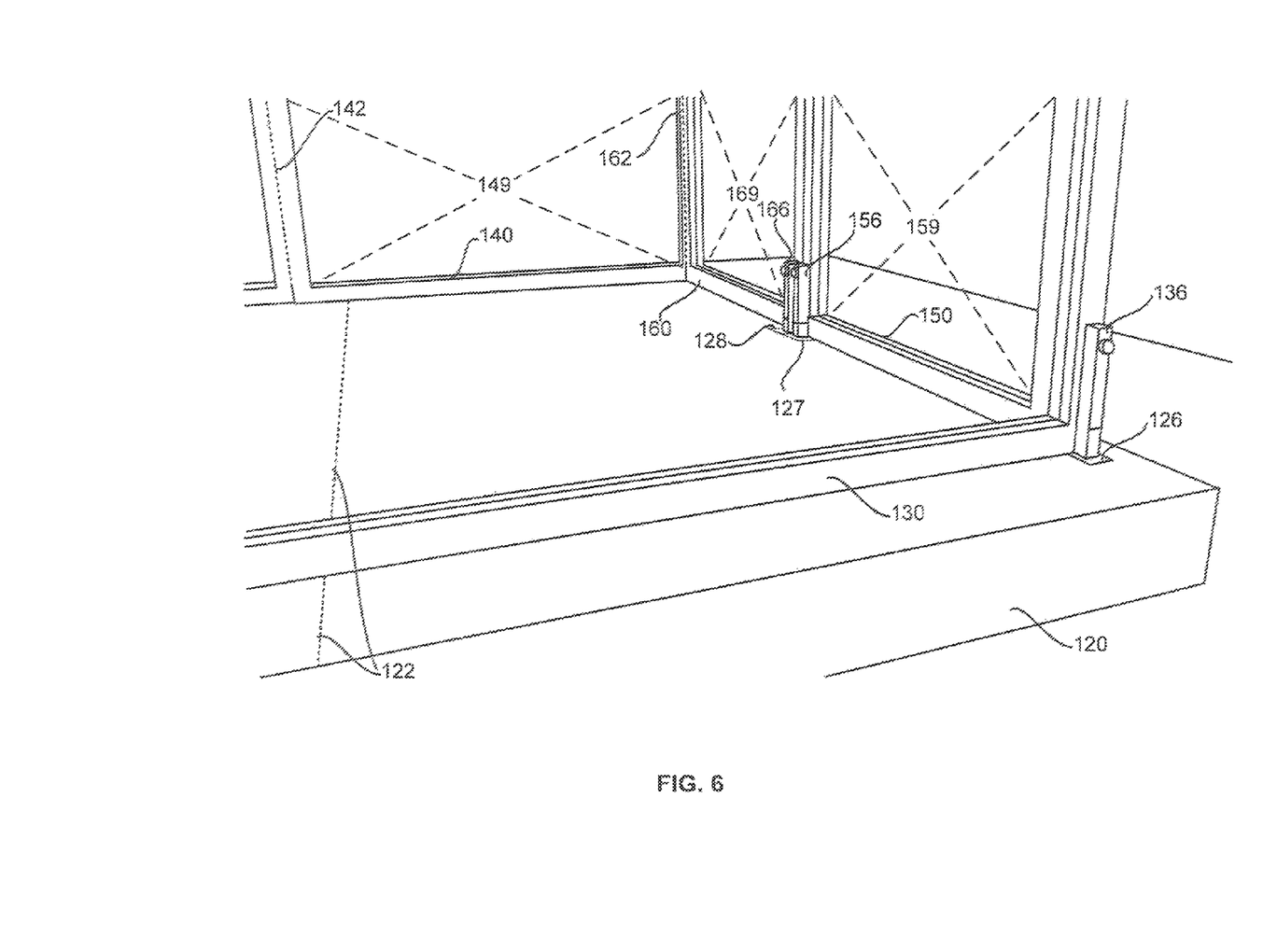
FIG. 6 is a perspective drawing of a lower section of an expanded porch showing a lock and anchor of a mobile utility structure from the left viewpoint, in accordance with various embodiments.
Figure 7:
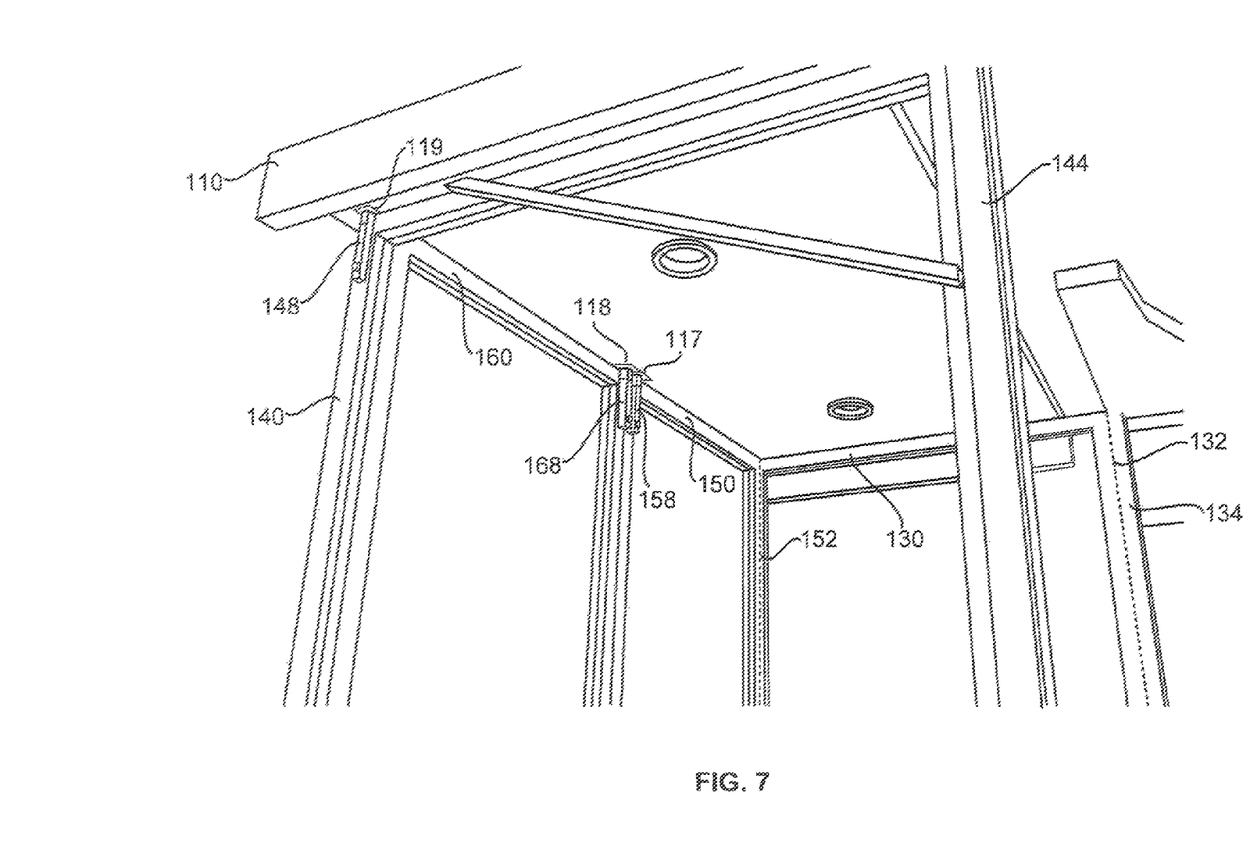
FIG. 7 is a perspective drawing of an upper section of an expanded porch showing a lock and anchor of a mobile utility structure from the right viewpoint, in accordance with various embodiments.

In accordance with various embodiments, as shown in FIGS. 4 and 5, anchors may also be located inside of the trailer area in a suitable manner to secure the panels 130, 140, 150 and 160. For example, anchors 237 and 238 may be located near the centerline of the trailer such that locks 136 and 146 respectively engage the anchors panel 130 and 140 may be located parallel to each other and access 106 forming a barrier across access 106. Anchors 236 and 239 may be located in any suitable position to secure panels 150 and 160 while the mobile structure is being transported. While not specifically shown in the figures, anchors may also be located on the roof of the trailer in positions configured to retain the various panels in the same position as the floor anchors.

In accordance with various embodiments, the lock (e.g. slide bolt) may dive into and contact the base of the anchor. This contact provides the panels with vertical support. As the anchor may be a recessed hole the sides of the anchor may contact the bolt providing the panels with lateral support. Using anchors and locks in the roof and floor provide the panels with additional rotational support. Thus the system of locks and anchors may provide each of the panels with vertical, lateral, and rotational rigidity. For example, anchors 117, 118, 127, and 128, when engaged with locks 158, 168, 156, and 166, respectively, provide panels 150 and 160 with additional vertical rigidity.

In accordance with various embodiments, as shown in FIG. 1 panels on the side of the mobile structure may also be adjusted allowing additional access to widows. For example an adjustable side panel 200 may swing out allowing access to an adjustable side roof 180. The adjustable side roof 180 may then be extended giving full view to additional glass panels that allow light into the mobile structure (209). In one example, side panels 190 and 200 may be located on opposing sides of the mobile structure. The adjustable side panels may be two large 4' by 7" moving doors that fold out to reveal inset displays. These displays may be poster boards, televisions, computers, or the like. The adjustable side roof 170 and 180 may include inset lights and operate as a canopy. Once each of these panels are open, they may reveal additional windows (e.g., two 4' by 7" fixed glazed panels) (199 and 209). In another example, as shown in FIG. 2, adjustable side panel 200 and adjustable side roof 180 may be closed along the side of the mobile structure protecting the window beneath.

In accordance with various embodiments, the various panels e.g. adjustable floor, roof, side roof, and side panel, may be extended, supported and located using typical off the shelf hinges, struts, legs, and/or other hardware. In various examples, the hardware, such as support struts 260 are nested between the panels when the structure is in a closed position. In an open position the hardware provides adequate support to operate the mobile utility structure in any of a verity of uses as discussed above.

Figure 11:
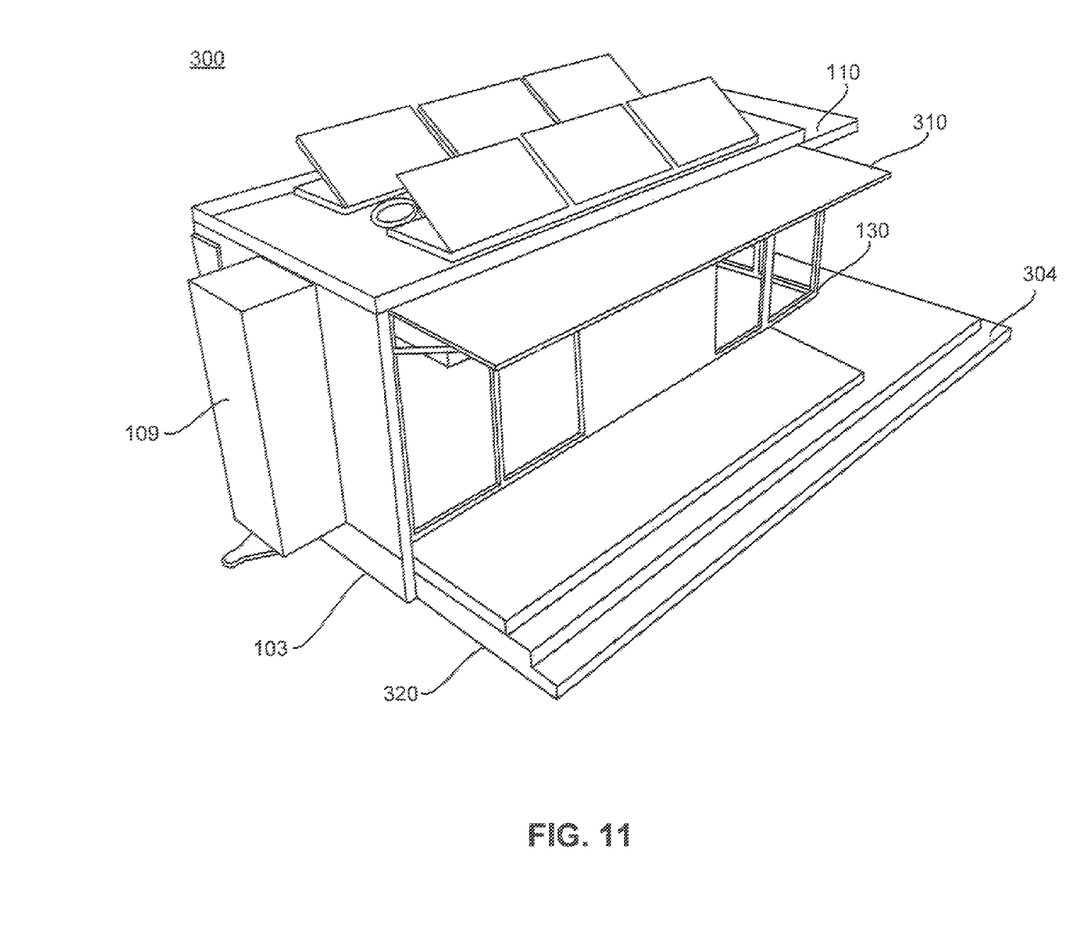
FIG. 11 is a perspective drawing of a mobile utility structure in a fully expanded position from the left front viewpoint, in accordance with various embodiments.

In accordance with various embodiments, portable decking 104 (FIG. 1) may be stored within the portable structure in a utility storage 109. As illustrated in FIG. 11, a utility storage 109 may be located on the tongue of the structure. The decking may be removed from the utility storage by a single person and set up around the expanded rear access of the mobile structure, giving the structure both easy access and an aesthetic appearance. Additionally, a skirt 103 may be stored in the utility storage. The skirt 103 may be applied around the base of the mobile structure giving it the appearance of a permanent structure and not the appearance of a trailer. Utility storage may also house a number of items including, for example, a generator, a fuel tank, electrical equipment such as batteries and inverters, water, water heaters, etc.

In accordance with various embodiments, the structure may comprise a locking mechanism causing, for example, the adjustable floor, roof, side roof, and side panel to securely mate to the trailer. Securely mating these panels to the trailer may act as a barrier keeping items in the structure and people out of the structure. The panels also provide protection to the glass panels during transportation of the mobile structure. Each of the adjustable panels interlock with the others and the trailer and create a sealed box structure for travel in accordance with road legal sizes as described prior. The adjustable panels also create a water seal for inclement weather using specifically located seals on the mating surfaces.

Figure 10:
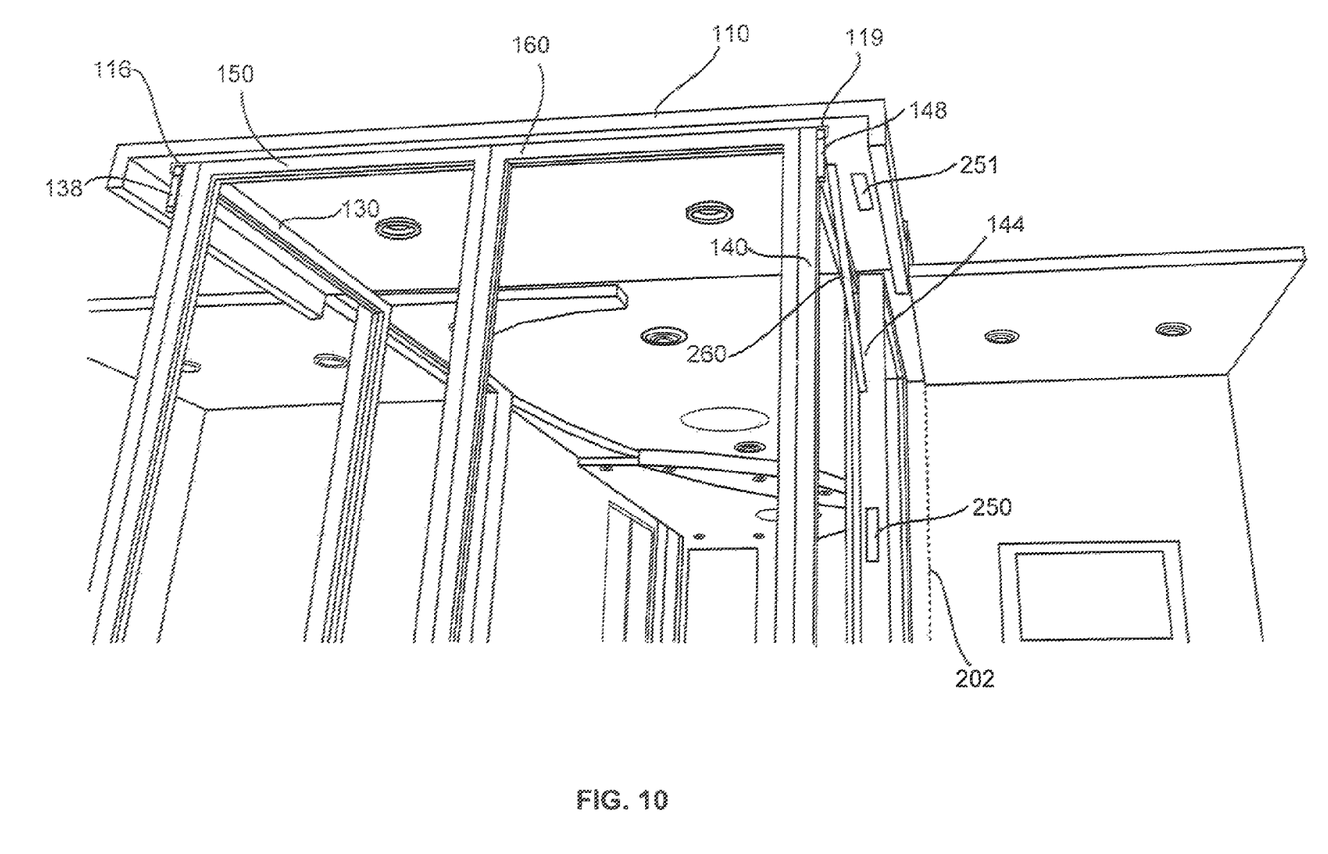
FIG. 10 is a perspective drawing of an upper section of an expanded porch of a mobile utility structure from the rear viewpoint, in accordance with various embodiments.

In accordance with various embodiments, the locking mechanism may be any lock known in the industry. In one example, an electromagnetic locking mechanism (creating approximately 1200 lbs of locking pressure) specifically placed in the structure holds the adjustable panels together to create a unique seal and safe for travel. The electromagnetic lock may be placed on the vertical support posts. In one example, as illustrated in FIG. 10, the electromagnetic lock may be placed on a vertical support post at the seam where the edges of the adjustable floor and the adjustable roof meet when in the closed position. The adjustable floor and the adjustable roof may have an electromagnet plate attached to their inside surfaces, located in a position which engages the electromagnet plate when in a closed position. In one example, FIG. 10 illustrations adjustable roof 110 having electromagnet plate 251 located in a position to engage electromagnet 250 located on the vertical support post 144 when adjustable roof 110 is in a closed position. In various embodiments, one or more electromagnetic locks may be used. For example, each adjustable roof, adjustable floor, adjustable side panel, and adjustable side roof may each have one or more electromagnetic lock and electromagnetic plate. In another example, one electromagnetic lock may engage and secure multiple electromagnetic plates located on multiple panels. The electromagnetic locking mechanism may be released with a transmitter key fob or override switch.

The location of the access, doors, windows, panels, adjustable features, etc. are not limited herein to only those locations specifically discussed above. For example the access may be located on any side of the structure, or portion of a side of the structure, providing for a variety of different configurations. The adjustable side panels, adjustable floors, adjustable roofs, adjustable side roofs, and multi-fold doors (along with other related elements discussed above) may be any size and location on the trailer providing for an even greater variety of different configuration based on the concepts discussed herein, as applied by a person of ordinary skill in the art. For example, as illustrated in FIG. 12, one side of the structure may have a hydraulic slide-out side 210, adjustable side panel 200 and adjustable side roof 180, whereas the opposite side of the structure may have a full length adjustable roof 310 and adjustable floor 320 as shown in FIGS. 11 and 12. Additionally, in one example, decking 304 (shown in FIGS. 11 and 12) may optionally be located on a portion of one or two or three sides of the structure. In another example, the decking may optionally extend around all of one or more sides of the structure, potentially extending around the structures entire circumference.

In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

The individual aspects, embodiments, and/or examples discussed above are not necessarily standalone features. On the contrary, unless otherwise indicated the various aspects, embodiments, and/or examples may be combined in any way to maximize the benefits and advantages of the various systems. It is the unique way in which these aspects, embodiments, and/or examples are incorporated into the structure that provide the unexpected result of a utility structure that is setup by one person in less time than it takes several people to set up typical display systems. The various combinations of aspects, embodiments, and/or examples allow the structure to open/close with ease; deploy quickly and be expanded to create a larger useable space as described above.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A trailer system comprising:
    an enclosed trailer having an access spanning at least a portion of one side of the trailer;
    an adjustable floor spanning at least a portion of the access, wherein the adjustable floor interfaces with a floor hinge to a horizontal support across the bottom of the access;
    an adjustable roof spanning at least a portion of the access, wherein the adjustable roof interfaces with a roof hinge to a horizontal support across the top of the access; and
    one or more multifold doors having at least a first panel and second panel, wherein the first panel connects to a first vertical support post by a first hinge, wherein the first panel connects to the second panel by a second hinge, wherein the first panel has at least one lock on the corner of the first panel on the side of the first panel opposite the first hinge, wherein the second panel has at least one lock on the corner of the second panel on the side opposite the second hinge,
    wherein, in response to a trailer open position, the first panel, the second panel, the adjustable roof, and the adjustable floor extend out of the trailer, providing an expanded usable interior trailer area, and
    wherein, in response to the trailer being in a closed position, the first panel and the second panel are folded inside the trailer and the adjustable roof and the adjustable floor are folded onto the side of the trailer.

2. The trailer system of claim 1, wherein, in response to the trailer being in a closed position, the adjustable floor and the adjustable roof contact one another on edges opposite their respective hinges, creating a barrier across at least a portion of the access, wherein the adjustable floor is operable to fold down from a closed position to an open position and operate as a floor of the expanded usable interior trailer area, wherein the adjustable roof is operable to fold up from a closed position to an open position and operate as a roof of the expanded usable interior trailer area.

3. The trailer system of claim 1, further comprising at least a second multifold door having a third panel and a fourth panel, wherein the third panel connects to a second vertical support post, located on the opposite side of the access as the first vertical support post, by a third hinge, wherein the third panel connects to the fourth panel by a fourth hinge, wherein the third panel has at least one lock on the corner of the third panel on the side opposite the third hinge, wherein the fourth panel has at least one lock on the corner of the fourth panel on the side opposite the fourth hinge.

4. The trailer system of claim 1, wherein, in response to being in the trailer open position the first panel and the third panel are located perpendicular to the access and point away from the trailer, wherein the second panel and the fourth panel are hinged toward each other and are operable as swinging doors for entrance into the trailer.

5. The trailer system of claim 2, wherein, in response to being in a trailer closed position, the second panel and the fourth panel are positioned such that the second hinge and the fourth hinge come into close proximity of one another creating a barrier across the access.

6. The trailer system of claim 1, wherein the first panel and the second panel comprise an exterior frame with a glass pane contained within the frame, wherein the glass pane substantially fills the area within the frame, wherein the glass pane is insulated from vibration within the frame by locating neoprene strips between the frame and the glass window allowing the glass window panels to be operable for use in the transportation industry.

7. The trailer system of claim 3, further comprising anchors located in the adjustable floor and adjustable roof, wherein the anchors are positioned such that the locks located on the first panel, the second panel, the third panel, and the fourth panel engage the anchors in the trailer open position and trailer closed position, wherein each of the locks comprise vertical sliding bolts that extend from the respective panel into the anchor and provide each of the lock's respective panel with increased vertical, lateral, and rotational rigidity.

8. The trailer system of claim 1, further comprising abutments located on at least one of the adjustable floor or the adjustable roof, wherein the abutments are protrusions that are parallel to the location of the panels in the trailer open position, wherein the abutments contact the panels in the trailer open position and prevent the panels from opening beyond the location of the abutments.

9. The trailer system of claim 2, further comprising at least one magnetic lock located on at least one of the first vertical support post or the second vertical support post and situated to secure at least one of the adjustable floor or the adjustable roof in a closed position.

10. The trailer system of claim 2 wherein the access is an opening in the rear of the trailer.

11. The trailer system of claim 1, further comprising:
an adjustable side roof connected by a side roof hinge to an upper horizontal support perpendicular to the access; and
an adjustable side panel connected by a side panel hinge to a side of the trailer and operable to cover the adjustable side roof in response to the adjustable side panel and the adjustable side roof being in a closed position and operable to be secured to the side of the adjustable side roof in response to the adjustable side panel and the adjustable side roof being in an open position.

12. The trailer system of claim 11, wherein the adjustable roof, adjustable floor, adjustable side roof, and adjustable side panel are supported by a plurality of hydraulic struts which nest between each of the adjustable roof, adjustable floor, adjustable side roof, and adjustable side panel when each of the adjustable roof, adjustable floor, adjustable side roof, and adjustable side panel are closed.

13. The trailer system of claim 11, further comprising glass panes positioned inside of frames that form the adjustable side panel in a closed position and the adjustable side roof in a closed position, wherein each glass pane is insulated from vibrations within the respective frame by locating neoprene strips between the frame and the glass pane allowing the glass pane to be operable for use in the transportation industry.

14. The trailer system of claim 1, further comprising a skirt that drapes from the base of the trailer to cover the trailer's wheels and undercarriage, giving the visual impression that the trailer is a stationary structure.

* * * * *